US 8,795,122 B2

(12) United States Patent
McCune et al.

(10) Patent No.: US 8,795,122 B2
(45) Date of Patent: Aug. 5, 2014

(54) TAPERED BEARINGS

(75) Inventors: Michael E. McCune, Colchester, CT (US); Lawrence E. Portlock, Bethany, CT (US)

(73) Assignee: United Technologies Corporation, Hartford, CT (US)

(*) Notice: Subject to any disclaimer, the term of this patent is extended or adjusted under 35 U.S.C. 154(b) by 0 days.

(21) Appl. No.: 13/484,818

(22) Filed: May 31, 2012

(65) Prior Publication Data

US 2012/0234019 A1     Sep. 20, 2012

Related U.S. Application Data

(63) Continuation of application No. 13/346,236, filed on Jan. 9, 2012, now abandoned, which is a continuation of application No. 11/504,220, filed on Aug. 15, 2006.

(51) Int. Cl.
*F16H 57/04*     (2010.01)

(52) U.S. Cl.
USPC .......................................... 475/159; 475/331

(58) Field of Classification Search
USPC ........................ 475/331, 159, 160
See application file for complete search history.

(56) References Cited

U.S. PATENT DOCUMENTS

| | | | |
|---|---|---|---|
| 2,684,591 A | 7/1954 | Lundquist | |
| 3,160,026 A | 12/1964 | Rosen | |
| 3,352,178 A | 11/1967 | Lindgren et al. | |
| 3,722,323 A | 3/1973 | Welch | |
| 4,583,413 A * | 4/1986 | Lack | 74/410 |
| 4,896,499 A | 1/1990 | Rice | |
| 5,081,832 A | 1/1992 | Mowill | |
| 5,211,541 A | 5/1993 | Fledderjohn et al. | |
| 5,302,031 A * | 4/1994 | Yuasa | 384/449 |
| 5,391,125 A | 2/1995 | Turra et al. | |
| 5,433,674 A * | 7/1995 | Sheridan et al. | 475/346 |
| 5,466,198 A | 11/1995 | McKibbin et al. | |
| 5,472,383 A | 12/1995 | McKibbin | |
| 6,223,616 B1 * | 5/2001 | Sheridan | 475/159 |
| 6,402,654 B1 | 6/2002 | Lanzon et al. | |
| 6,530,858 B1 | 3/2003 | Uroso et al. | |
| 6,669,597 B1 | 12/2003 | Uroso et al. | |
| 6,732,502 B2 | 5/2004 | Seda et al. | |
| 7,021,042 B2 | 4/2006 | Law | |

(Continued)

FOREIGN PATENT DOCUMENTS

| | | |
|---|---|---|
| EP | 1114949 | 7/2001 |
| EP | 1876338 A2 | 1/2008 |

(Continued)

OTHER PUBLICATIONS

Japanese Office Action for Japanese Application No. 2007-202444, Aug. 3, 2010.

(Continued)

*Primary Examiner* — Derek D Knight
(74) *Attorney, Agent, or Firm* — Carlson, Gaskey & Olds, P.C.

(57) ABSTRACT

A gear support assembly for a turbine engine includes an epicyclic gear arrangement and a first tapered bearing and a second tapered bearing spaced apart from the first tapered bearing. The first tapered bearing and the second tapered bearing are arranged axially forward of the epicyclic gear arrangement and support the epicyclic gear arrangement.

20 Claims, 3 Drawing Sheets

(56) References Cited

U.S. PATENT DOCUMENTS

| | | |
|---|---|---|
| 7,591,754 B2 | 9/2009 | Duong et al. |
| 7,662,059 B2 | 2/2010 | McCune |
| 7,704,178 B2 * | 4/2010 | Sheridan et al. ............ 475/331 |
| 8,074,440 B2 | 12/2011 | Kohlenberg |
| 2002/0064327 A1 * | 5/2002 | Toda et al. ................... 384/589 |
| 2004/0112041 A1 | 6/2004 | Law |
| 2005/0026745 A1 | 2/2005 | Mitrovic |
| 2008/0006018 A1 | 1/2008 | Sheridan et al. |
| 2008/0044276 A1 | 2/2008 | McCune et al. |
| 2008/0116009 A1 | 5/2008 | Sheridan et al. |
| 2009/0056306 A1 | 3/2009 | Suciu et al. |
| 2009/0090096 A1 | 4/2009 | Sheridan |
| 2009/0293278 A1 | 12/2009 | Duong et al. |
| 2009/0298640 A1 | 12/2009 | Duong et al. |
| 2011/0130246 A1 | 6/2011 | McCune |

FOREIGN PATENT DOCUMENTS

| | | |
|---|---|---|
| EP | 2224100 | 9/2010 |
| EP | 2559913 A1 | 2/2013 |
| FR | 1357038 | 4/1964 |
| JP | 46-36927 | 10/1971 |
| JP | 5-248267 A | 9/1993 |
| JP | 9-317833 A | 12/1997 |
| JP | 2001-208146 A | 8/2001 |
| JP | 39-20031 B2 | 5/2007 |

OTHER PUBLICATIONS

European Search Report for EP Application No. 07253078.5, Dec. 5, 2007.

European Search Report and Written Opinion for European Application No. EP 12 19 8136 completed on Aug. 21, 2013.

International Search Report and Written Opinion for International Application No. PCT/US2012/071906 completed on Aug. 22, 2013.

Dudley ("Gear Handbook: The design, Manufacture, and Application of Gears", p. 3-15).

\* cited by examiner

TAPERED BEARINGS

CROSS REFERENCE TO RELATED APPLICATIONS

The present disclosure is a continuation of U.S. Ser. No. 13/346,236, filed Jan. 9, 2012, which is a continuation of U.S. patent application Ser. No. 11/504,220, filed Aug. 16, 2006.

BACKGROUND OF THE INVENTION

This invention relates to a ring gear used in an epicyclic gear train of a gas turbine engine.

Gas turbine engines typically employ an epicyclic gear train connected to the turbine section of the engine, which is used to drive the turbo fan. In a typical epicyclic gear train, a sun gear receives rotational input from a turbine shaft through a compressor shaft. A carrier supports intermediate gears that surround and mesh with the sun gear. A ring gear surrounds and meshes with the intermediate gears. In arrangements in which the carrier is fixed against rotation, the intermediate gears are referred to as "star" gears and the ring gear is coupled to an output shaft that supports the turbo fan.

Typically, the ring gear is connected to the turbo fan shaft using a spline ring. The spline ring is secured to a flange of the turbo fan shaft using circumferentially arranged bolts. The spline ring includes splines opposite the flange that supports a splined outer circumferential surface of the ring gear. The ring gear typically includes first and second portions that provide teeth facing in opposite directions, which mesh with complimentary oppositely facing teeth of the star gears.

An epicyclic gear train must share the load between the gears within the system. As a result, the splined connection between the ring gear and spline ring is subject to wear under high loads and deflection. Since the spline connection requires radial clearance, it is difficult to get a repeatable balance of the turbo fan assembly. Balance can also deteriorate over time with spline wear.

SUMMARY OF THE INVENTION

A gear support assembly for a turbine engine according to an exemplary aspect of the present disclosure comprises an epicyclic gear arrangement, a first tapered bearing and a second tapered bearing spaced apart from the first tapered bearing, the first tapered bearing and the second tapered bearing being arranged axially forward of the epicyclic gear arrangement and supporting the epicyclic gear arrangement.

In a further non-limiting embodiment of any of the foregoing assembly embodiments, the first tapered bearing and the second tapered bearing are located radially inwards from a radially outer surface of the epicyclic gear arrangement.

In a further non-limiting embodiment of any of the foregoing assembly embodiments, the first tapered bearing and the second tapered bearing are located radially outwards of a radially inner surface of the epicyclic gear arrangement.

A further non-limiting embodiment of any of the foregoing assembly embodiments includes a support arm extending forward from the epicyclic gear arrangement, and at least one of the first tapered bearing and the second tapered bearing is mounted on the support arm.

In a further non-limiting embodiment of any of the foregoing assembly embodiments, the support arm is connected at one end at a radially outer location of the epicyclic gear arrangement.

In a further non-limiting embodiment of any of the foregoing assembly embodiments, at least one of the first tapered bearing and the second tapered bearing includes a cylindrical roller element.

In a further non-limiting embodiment of any of the foregoing assembly embodiments, the cylindrical roller element is supported on a tapered race.

In a further non-limiting embodiment of any of the foregoing assembly embodiments, the first tapered bearing and the second tapered bearing are spaced an equivalent radial distance from a central axis of the epicyclic gear arrangement.

In a further non-limiting embodiment of any of the foregoing assembly embodiments, the first tapered bearing includes a first roller element defining a first rotational axis and the second tapered bearing includes a second roller element defining a second rotational axis such that the first rotational axis and the second rotational axis intersect at a position that is radially inwards from the first roller element and the second roller element.

In a further non-limiting embodiment of any of the foregoing assembly embodiments, the first tapered bearing includes a first roller element defining a first rotational axis and the second tapered bearing includes a second roller element defining a second rotational axis such that the first rotational axis and the second rotational axis intersect at a position that is radially inwards from a central axis of the epicyclic gear arrangement.

A gas turbine engine according to an exemplary aspect of the present disclosure comprises a compressor section, a combustor arranged in fluid receiving communication with the compressor section, a turbine section arranged in fluid receiving communication with the combustor, an epicyclic gear arrangement coupled to be driven by the turbine section and a first tapered bearing and a second tapered bearing spaced apart from the first tapered bearing, the first tapered bearing and the second tapered bearing being arranged axially forward of the epicyclic gear arrangement and supporting the epicyclic gear arrangement.

A further non-limiting embodiment of any of the foregoing embodiments includes a fan located axially forward of the compressor section, wherein a forward one of the first tapered bearing and the second tapered bearing is located at an equivalent axial position of the fan.

A further non-limiting embodiment of any of the foregoing embodiments includes a fan located axially forward of the compressor section, wherein a forward one of the first tapered bearing and the second tapered bearing is located at an equivalent axial position of the fan and a rear one of the first tapered bearing and the second tapered bearing is located at a non-equivalent axial position of the fan.

In a further non-limiting embodiment of any of the foregoing embodiments, the first tapered bearing and the second tapered bearing are located radially inwards from a radially outer surface of the epicyclic gear arrangement.

A further non-limiting embodiment of any of the foregoing embodiments includes a support arm extending forward from the epicyclic gear arrangement, and at least one of the first tapered bearing and the second tapered bearing being mounted on the support arm.

In a further non-limiting embodiment of any of the foregoing embodiments, the support arm is connected at one end at a radially outer location of the epicyclic gear arrangement.

In a further non-limiting embodiment of any of the foregoing embodiments, at least one of the first tapered bearing and the second tapered bearing includes a second cylindrical roller element.

In a further non-limiting embodiment of any of the foregoing embodiments, the cylindrical roller element is supported on a tapered race.

In a further non-limiting embodiment of any of the foregoing embodiments, the first tapered bearing and the second tapered bearing are spaced an equivalent radial distance from a central axis of the epicyclic gear arrangement.

In a further non-limiting embodiment of any of the foregoing embodiments, the first tapered bearing includes a first roller element defining a first rotational axis and the second tapered bearing includes a second roller element defining a second rotational axis such that the first rotational axis and the second rotational axis intersect at a position that is radially inwards from the first roller element and the second roller element.

In a further non-limiting embodiment of any of the foregoing embodiments, the first tapered bearing includes a first roller element defining a first rotational axis and the second tapered bearing includes a second roller element defining a second rotational axis such that the first rotational axis and the second rotational axis intersect at a position that is radially inwards from a central axis of the epicyclic gear arrangement.

DETAILED DESCRIPTION OF THE PREFERRED EMBODIMENT

Figure 1:
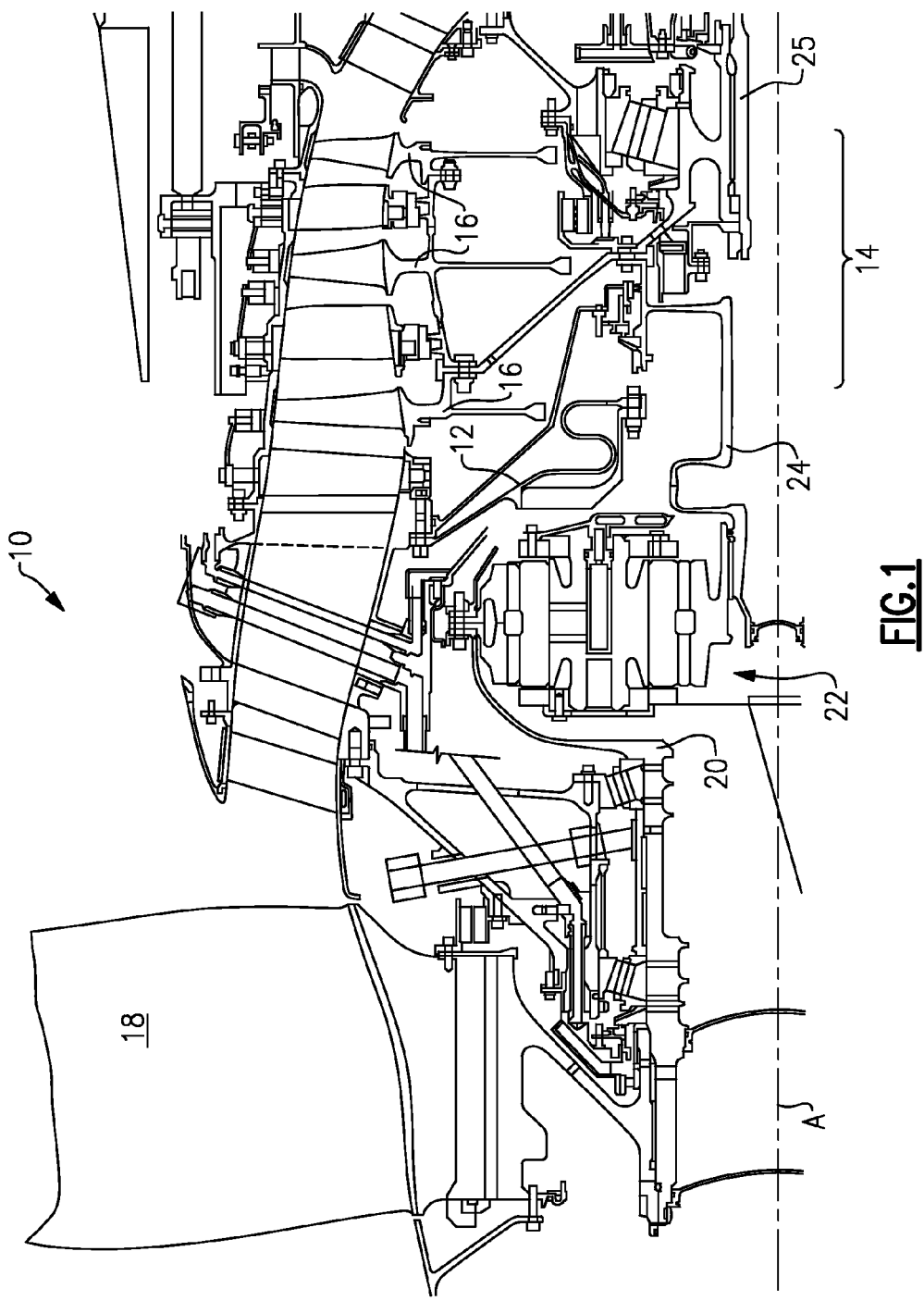
FIG. 1 is a partial cross-sectional view of a front portion of a gas turbine engine illustrating a turbo fan, epicyclic gear train and a compressor section.

A portion of a gas turbine engine 10 is shown schematically in FIG. 1. The turbine engine 10 includes a fixed housing 12 that is constructed from numerous pieces secured to one another. A compressor section 14 having compressor hubs 16 with blades are driven by a turbine shaft 25 about an axis A. A turbo fan 18 is supported on a turbo fan shaft 20 that is driven by a compressor shaft 24, which supports the compressor hubs 16, through an epicyclic gear train 22.

In the example arrangement shown, the epicyclic gear train 22 is a star gear train. Referring to FIG. 2, the epicyclic gear train 22 includes a sun gear 30 that is connected to the compressor shaft 24, which provides rotational input, by a splined connection. A carrier 26 is fixed to the housing 12 by a torque frame 28 using fingers (not shown) known in the art. The carrier 26 supports star gears 32 using journal bearings 34 that are coupled to the sun gear 30 by meshed interfaces between the teeth of sun and star gears 30, 32. Multiple star gears 32 are arranged circumferentially about the sun gear 30. Retainers 36 retain the journal bearings 34 to the carrier 26. A ring gear 38 surrounds the carrier 26 and is coupled to the star gears 32 by meshed interfaces. The ring gear 38, which provides rotational output, is secured to the turbo fan shaft 20 by circumferentially arranged fastening elements, which are described in more detail below.

Figure 2A:
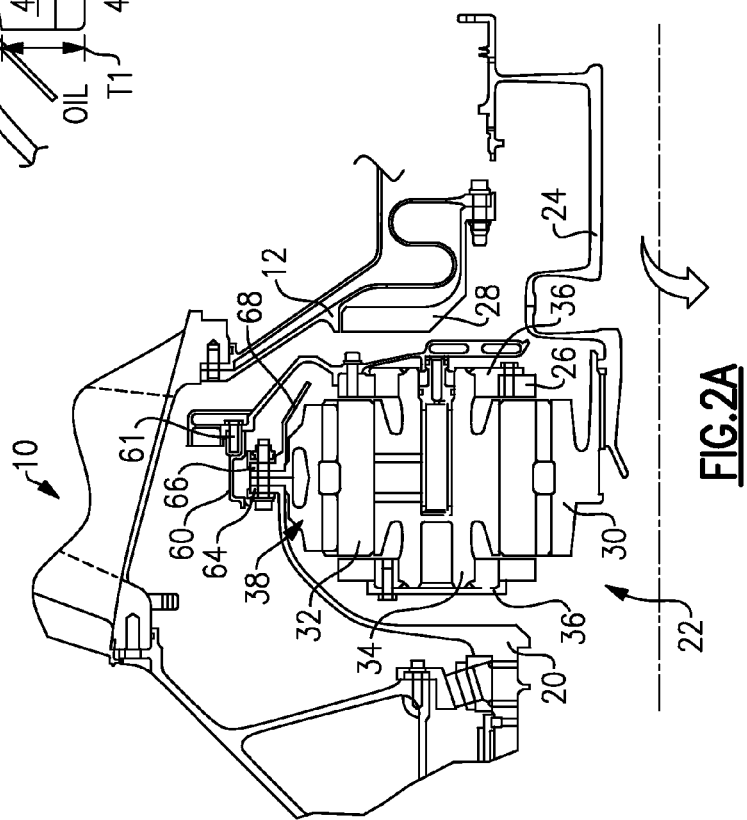
FIG. 2A is an enlarged cross-sectional view of the epicyclic gear train shown in FIG. 1.
Figure 2B:
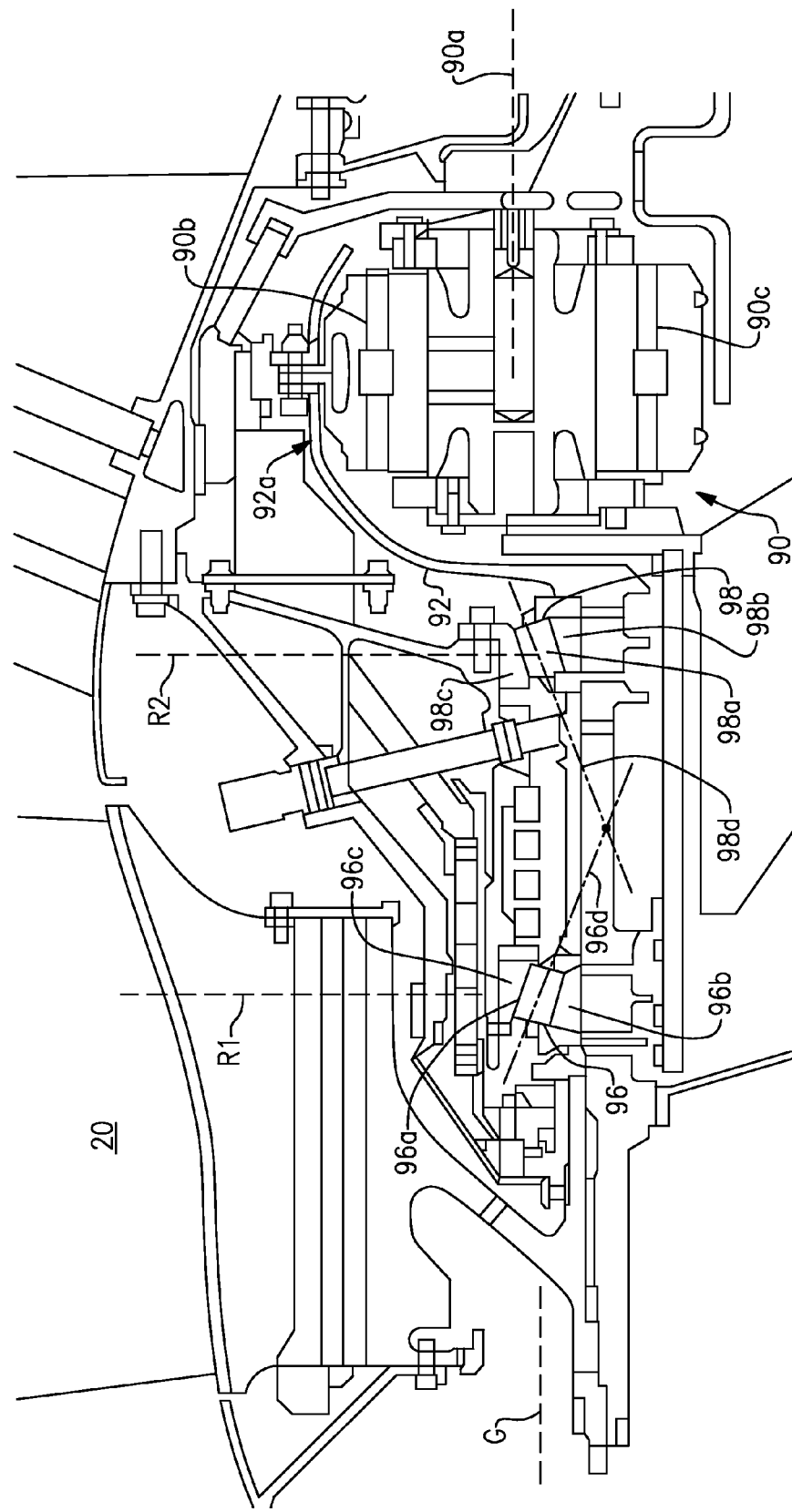
FIG. 2B is an expanded view of a portion of FIG. 1.

FIG. 2B is an expanded view of a portion of FIG. 2A. As shown in FIG. 2B, a gearbox assembly 90, which is shown as an epicyclic gear arrangement, is arranged about a central axis 90a. The gearbox assembly 90 is supported in part by a forward, first bearing 96 and a rear, second bearing 98 that is spaced apart from the forward bearing 96. The forward bearing 96 and the rear bearing 98 are mounted on a support arm 92. The support arm 92 extends axially forwardly from the gearbox assembly 90 and is connected at one end 92a at a radially outer location of the gearbox assembly 90.

In the example, the forward bearing 96 and the rear bearing 98 are located axially forward of the gearbox assembly 90 and are spaced an equivalent radial distance along line G from the central axis 90a. That is, the bearings 96 and 98 are generally axially aligned. In the illustrated example, the forward bearing 96 is located at an equivalent axial position of the fan 20, as represented by the radial line R1, and the rear bearing 98 is located at a non-equivalent axial position of the fan 20, as represented by the radial line R2.

As further shown in FIG. 2B, the forward bearing 96 and the rear bearing 98 are tapered bearings. In the example, the forward bearing 96 includes a first cylindrical roller element 96a that is supported between a tapered inner race 96b and a tapered outer race 96c. The rear bearing 98 includes a second cylindrical roller element 98a that is supported between a tapered inner race 98b and a tapered outer race 98c. The first cylindrical roller element 96a defines a first rotational axis 96d and the second cylindrical roller element 98a defines a second rotational axis 98d. As shown, the rotational axes 96d and 98d intersect at a position that is radially inwards from the first cylindrical roller element 96a and the second cylindrical roller element 98a. Thus, the intersection point is radially inwards of line G. As also shown, the point of intersection is also radially inwards of a radially outer surface 90b of the gearbox assembly 90 and radially outwards of a radially inner surface 90c of the gearbox assembly 90.

Figure 4:
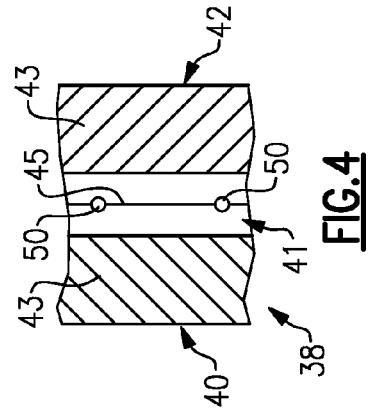
FIG. 4 is a view of the ring gear shown in FIG. 3 viewed in a direction that faces the teeth of the ring gear in FIG. 3.
Figure 3:
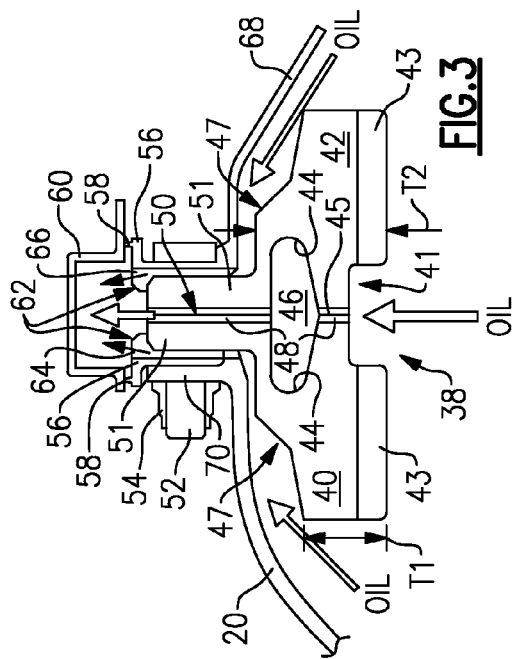
FIG. 3 is an enlarged cross-sectional view of an example ring gear similar to the arrangement shown in FIG. 2.

Referring to FIGS. 3 and 4, the ring gear 38 is a two-piece construction having first and second portions 40, 42. The first and second portions 40, 42 abut one another at a radial interface 45. A trough 41 separates oppositely angled teeth 43 (best shown in FIG. 4) on each of the first and second portions 40, 42. The arrangement of teeth 43 forces the first and second portions 40, 42 toward one another at the radial interface 45. The back side of the first and second portions 40, 42 includes a generally S-shaped outer circumferential surface 47 that, coupled with a change in thickness, provides structural rigidity and resistance to overturning moments. The first and second portions 40, 42 have a first thickness T1 that is less than a second thickness T2 arranged axially inwardly from the first thickness T1. The first and second portions 40, 42 include facing recesses 44 that form an internal annular cavity 46.

The first and second portions 40, 42 include flanges 51 that extend radially outward away from the teeth 43. The turbo fan shaft 20 includes a radially outwardly extending flange 70 that is secured to the flanges 51 by circumferentially arranged bolts 52 and nuts 54, which axially constrain and affix the turbo fan shaft 20 and ring gear 38 relative to one another. Thus, the spline ring is eliminated, which also reduces heat generated from windage and churning that resulted from the sharp edges and surface area of the splines. The turbo fan shaft 20 and ring gear 38 can be rotationally balanced with one another since radial movement resulting from the use of splines is eliminated. An oil baffle 68 is also secured to the flanges 51, 70 and balanced with the assembly.

Seals 56 having knife edges 58 are secured to the flanges 51, 70. The first and second portions 40, 42 have grooves 48 at the radial interface 45 that form a hole 50, which expels oil through the ring gear 38 to a gutter 60 that is secured to the carrier 26 with fasteners 61 (FIG. 2). The direct radial flow path provided by the grooves 48 reduces windage and churning by avoiding the axial flow path change that existed with splines. That is, the oil had to flow radially and then axially to exit through the spline interface. The gutter 60 is constructed from a soft material such as aluminum so that the knife edges 58, which are constructed from steel, can cut into the aluminum if they interfere. Referring to FIG. 3, the seals 56 also include oil return passages 62 provided by first and second slots 64 in the seals 56, which permit oil on either side of the ring gear 38 to drain into the gutter 60. In the example shown in FIG. 2, the first and second slots 64, 66 are instead provided in the flange 70 and oil baffle 68, respectively.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gear support assembly for a turbine engine, comprising:
    an epicyclic gear arrangement including a plurality of intermediate gears, a carrier supporting the plurality of intermediate gears, a sun gear that meshes with the plurality of intermediate gears and a ring gear surrounding and meshing with the plurality of intermediate gears, the ring gear including an inner periphery with teeth, an outer circumferential surface opposite the teeth, a flange projecting radially outwards from the outer circumferential surface, and a passage operable to convey oil though the ring gear, the passage extending through the flange and opening at the inner periphery and at a radially outer tip of the flange;
    a gutter configured to collect oil, the gutter being located radially outwards of the flange and the passage opening into the gutter;
    a seal secured to, and axially flanking, the flange, the seal including a slot configured to permit oil from a side of the ring gear to drain into the gutter; and
    a first tapered bearing and a second tapered bearing spaced apart from the first tapered bearing, the first tapered bearing and the second tapered bearing being arranged axially forward of the epicyclic gear arrangement and supporting the epicyclic gear arrangement, wherein the first tapered bearing includes a first roller element supported by a first inner race and defining a first rotational axis and the second tapered bearing includes a second roller element supported by a second inner race and defining a second rotational axis such that the first rotational axis and the second rotational axis intersect at a position that is radially inwards from the first inner race and the second inner race.

2. The gear support assembly as recited in claim 1, wherein the first tapered bearing and the second tapered bearing are located radially inwards from a radially outer surface of the epicyclic gear arrangement.

3. The gear support assembly as recited in claim 1, wherein the first tapered bearing and the second tapered bearing are located radially outwards of a radially inner surface of the epicyclic gear arrangement.

4. The gear support assembly as recited in claim 1, including a support arm extending forward from the epicyclic gear arrangement, at least one of the first tapered bearing and the second tapered bearing being mounted on the support arm.

5. The gear support assembly as recited in claim 4, wherein the support arm is connected at one end at a radially outer location of the epicyclic gear arrangement.

6. The gear support assembly as recited in claim 1, wherein at least one of the first tapered bearing and the second tapered bearing includes a cylindrical roller element.

7. The gear support assembly as recited in claim 6, wherein the cylindrical roller element is supported on a tapered race.

8. The gear support assembly as recited in claim 1, wherein the first tapered bearing and the second tapered bearing are spaced an equivalent radial distance from a central axis of the epicyclic gear arrangement.

9. A turbine engine comprising:
    a compressor section;
    a combustor arranged in fluid receiving communication with the compressor section;
    a turbine section arranged in fluid receiving communication with the combustor;
    an epicyclic gear arrangement coupled to be driven by the turbine section, the epicyclic gear arrangement including a plurality of intermediate gears, a carrier supporting the plurality of intermediate gears, a sun gear that meshes with the plurality of intermediate gears and a ring gear surrounding and meshing with the plurality of intermediate gears, the ring gear including an inner periphery with teeth, an outer circumferential surface opposite the teeth, a flange projecting radially outwards from the outer circumferential surface, and a passage operable to convey oil though the ring gear, the passage extending through the flange and opening at the inner periphery and at a radially outer tip of the flange;
    a gutter configured to collect oil, the gutter located radially outwards of the flange and the passage opening into the gutter;
    a seal secured to, and axially flanking, the flange, the seal including a slot operable to allow oil from a side of the ring gear to drain into the gutter; and
    a first tapered bearing and a second tapered bearing spaced apart from the first tapered bearing, the first tapered bearing and the second tapered bearing being arranged axially forward of the epicyclic gear arrangement and supporting the epicyclic gear arrangement.

10. The turbine engine as recited in claim 9, including a fan located axially forward of the compressor section, wherein a forward one of the first tapered bearing and the second tapered bearing is located at an equivalent axial position of the fan.

11. The turbine engine as recited in claim 9, including a fan located axially forward of the compressor section, wherein a forward one of the first tapered bearing and the second tapered bearing is located at an equivalent axial position of the fan and a rear one of the first tapered bearing and the second tapered bearing is located at a non-equivalent axial position of the fan.

12. The turbine engine as recited in claim 9, wherein the first tapered bearing and the second tapered bearing are located radially inwards from a radially outer surface of the epicyclic gear arrangement.

13. The turbine engine as recited in claim 9, including a support arm extending forward from the epicyclic gear arrangement, at least one of the first tapered bearing and the second tapered bearing being mounted on the support arm.

14. The turbine engine as recited in claim 13, wherein the support arm is connected at one end at a radially outer location of the epicyclic gear arrangement.

15. The turbine engine as recited in claim 9, wherein at least one of the first tapered bearing and the second tapered bearing includes a second cylindrical roller element.

16. The turbine engine as recited in claim 15, wherein the cylindrical roller element is supported on a tapered race.

17. The turbine engine as recited in claim 9, wherein the first tapered bearing and the second tapered bearing are spaced an equivalent radial distance from a central axis of the epicyclic gear arrangement.

18. The turbine engine as recited in claim 9, wherein the first tapered bearing includes a first roller element defining a first rotational axis and the second tapered bearing includes a second roller element defining a second rotational axis such that the first rotational axis and the second rotational axis intersect at a position that is radially inwards from the first roller element and the second roller element.

19. A gear support assembly for a turbine engine, comprising:
   an epicyclic gear arrangement including a plurality of intermediate gears, a carrier supporting the plurality of intermediate gears, a sun gear that meshes with the plurality of intermediate gears and a ring gear surrounding and meshing with the plurality of intermediate gears, the ring gear including an inner periphery with teeth, an outer circumferential surface opposite the teeth, a flange projecting radially outwards from the outer circumferential surface, and a passage operable to convey oil though the ring gear, the passage extending through the flange and opening at the inner periphery and at a radially outer tip of the flange;
   a gutter configured to collect oil, the gutter being located radially outwards of the flange and the passage opening into the gutter;
   an arm secured to the flange, and a slot operable to allow oil to pass into the gutter through a connection between the flange and the arm; and
   a first tapered bearing and a second tapered bearing spaced apart from the first tapered bearing, the first tapered bearing and the second tapered bearing being arranged axially forward of the epicyclic gear arrangement and supporting the epicyclic gear arrangement, wherein the first tapered bearing includes a first roller element supported by a first inner race and defining a first rotational axis and the second tapered bearing includes a second roller element supported by a second inner race and defining a second rotational axis such that the first rotational axis and the second rotational axis intersect at a position that is radially inwards from the first inner race and the second inner race.

20. A turbine engine comprising:
   a compressor section;
   a combustor arranged in fluid receiving communication with the compressor section;
   a turbine section arranged in fluid receiving communication with the combustor:
   an epicyclic gear arrangement coupled to be driven by the turbine section, the epicyclic gear arrangement including a plurality of intermediate gears, a carrier supporting the plurality of intermediate gears, a sun gear that meshes with the plurality of intermediate gears and a ring gear surrounding and meshing with the plurality of intermediate gears, the ring gear including an inner periphery with teeth, an outer circumferential surface opposite the teeth, a flange projecting radially outwards from the outer circumferential surface, and a passage operable to convey oil though the ring gear, the passage extending through the flange and opening at the inner periphery and at a radially outer tip of the flange;
   a gutter configured to collect oil, the gutter located radially outwards of the flange and the passage opening into the gutter; and
   an arm secured to the flange, and a slot operable to allow oil to pass into the gutter through a connection between the flange and the arm.

* * * * *